US009501754B2

(12) United States Patent
Gillen et al.

(10) Patent No.: US 9,501,754 B2
(45) Date of Patent: Nov. 22, 2016

(54) ARRANGING FOR SHIPMENT OF A PACKAGE WITHOUT GENERATING A SHIPPING LABEL

(71) Applicant: United Parcel Service of America, Inc., Atlanta, GA (US)

(72) Inventors: Robert J. Gillen, Alpharetta, GA (US); Mark S. Lewis, Roswell, GA (US)

(73) Assignee: UNITED PARCEL SERVICE OF AMERICA, INC., Atlanta, GA (US)

(*) Notice: Subject to any disclaimer, the term of this patent is extended or adjusted under 35 U.S.C. 154(b) by 0 days.

(21) Appl. No.: 14/645,854

(22) Filed: Mar. 12, 2015

(65) Prior Publication Data
US 2015/0186833 A1 Jul. 2, 2015

Related U.S. Application Data

(63) Continuation of application No. 13/456,922, filed on Apr. 26, 2012, now Pat. No. 9,016,559.

(51) Int. Cl.
*G06Q 10/08* (2012.01)

(52) U.S. Cl.
CPC .................. *G06Q 10/083* (2013.01)

(58) Field of Classification Search
CPC .................................................. G06Q 10/083
See application file for complete search history.

(56) References Cited

U.S. PATENT DOCUMENTS

| 5,602,382 | A | 2/1997 | Ulvr et al. |
| 5,903,864 | A | 5/1999 | Gadbois et al. |
| 5,945,919 | A | 8/1999 | Trask |
| 6,055,520 | A | 4/2000 | Heiden et al. |
| 6,694,248 | B2 | 2/2004 | Smith et al. |
| 6,889,194 | B1 | 5/2005 | Kadaba |
| 6,937,992 | B1 | 8/2005 | Benda et al. |
| 6,970,855 | B2 | 11/2005 | Das et al. |
| 7,853,481 | B1 | 12/2010 | Johnson |
| 8,010,463 | B2 | 8/2011 | Gillen |
| 9,016,559 | B2 | 4/2015 | Gillen et al. |
| 2002/0099567 | A1 | 7/2002 | Joao |

(Continued)

FOREIGN PATENT DOCUMENTS

WO   WO 96/38800   12/1996

OTHER PUBLICATIONS

International Searching Authority, International Search Report and Written Opinion for International Application No. PCT/US2013/029332, May 20, 2015, 10 pages, United States Patent and Trademark Office, U.S.A.

(Continued)

*Primary Examiner* — Kristy A Haupt
(74) *Attorney, Agent, or Firm* — Alston & Bird LLP

(57) ABSTRACT

Methods, systems, apparatuses, and computer program products are provided for arranging for shipping a package without the customer needing to generate or apply a shipping label, or any other information, to the package. In one embodiment, a system may comprise a carrier server and a carrier device. The carrier server may receive and store a smart code and shipping information associated with the package, which it may link together. The carrier device may capture the smart code from the package and send a request, including the smart code, to the carrier server for related shipping information. The carrier server may receive the request from the carrier device, retrieve the shipping information based on the smart code, and send the shipping information to the carrier device. The carrier device may receive the shipping information and generate a shipping label for the package based on the shipping information.

27 Claims, 7 Drawing Sheets

(56) References Cited

U.S. PATENT DOCUMENTS

| | | | |
|---|---|---|---|
| 2002/0152174 A1 | 10/2002 | Woods et al. | |
| 2003/0093383 A1 | 5/2003 | Reich et al. | |
| 2004/0073449 A1 | 4/2004 | Yang | |
| 2004/0203909 A1 | 10/2004 | Koster | |
| 2004/0230542 A1* | 11/2004 | Obrea | G07B 17/00024 |
| | | | 705/401 |
| 2004/0236707 A1 | 11/2004 | Lingdell | |
| 2005/0119786 A1 | 6/2005 | Kadaba | |
| 2005/0251402 A1 | 11/2005 | Olsen et al. | |
| 2008/0290153 A1 | 11/2008 | Jouvin et al. | |
| 2008/0300903 A1* | 12/2008 | Lundy | G06Q 10/08 |
| | | | 705/1.1 |
| 2009/0314835 A1 | 12/2009 | Jackson | |
| 2011/0040650 A1 | 2/2011 | Johnson | |
| 2012/0003964 A1* | 1/2012 | Soo | G06F 17/3087 |
| | | | 455/414.1 |
| 2012/0209890 A1 | 8/2012 | Nowacki et al. | |

OTHER PUBLICATIONS

Office Action for Corresponding Canadian Application No. 2,655,218 dated Aug. 9, 2010.
International Search Report from PCT/US2007/014418, dated Sep. 15, 2008.
United States Patent and Trademark Office, Office Action for U.S. Appl. No. 13/456,922, Dec. 30, 2013, 21 pages, USA.
United States Patent and Trademark Office, Office Action for U.S. Appl. No. 13/456,922, Jun. 27, 2014, 20 pages, USA.
United States Patent and Trademark Office, Notice of Allowance for U.S. Appl. No. 13/456,922, Jan. 2, 2015, 10 pages, USA.
Canadian Intellectual Property Office, Requisition by the Examiner for Application No. 2,871,416, Dec. 11, 2015, 3 pages, Canada.
European Patent Office, Extended European Search Report for Application No. 13712958.1, Jul. 8, 2016, 6 pages, Germany.

* cited by examiner

ARRANGING FOR SHIPMENT OF A PACKAGE WITHOUT GENERATING A SHIPPING LABEL

CROSS-REFERENCE TO RELATED APPLICATIONS

This application is a continuation of U.S. application Ser. No. 13/456,922, filed Apr. 26, 2012, the contents of which are hereby incorporated herein in its entirety by reference.

BACKGROUND OF THE INVENTION

The shipping industry has for years provided a service to customers allowing them to send packages to destinations all around the world. To enable the shipper to identify, route, and deliver the packages efficiently to their intended destinations, shippers typically rely on printing a shipping label that may be applied to the package before delivery. The shipping label may indicate information such as the name and address of the sender, the name and address of the recipient, the type of delivery service, as well as various other pieces of information related to the delivery of the package. In some cases, the shipper may include one or more special codes, such as bar codes or MaxiCodes, on the package that may be scanned quickly and easily for routing and tracking purposes as the package is being delivered.

When a customer wants to ship a package using the services provided by the shipper, the customer typically visits a facility of the shipper to provide shipping information for the package so that a shipping label can be generated. As a result, the customer may face several inconveniences related to shipping a package, such as searching for a nearby facility where the package may be dropped off, traveling to and from the facility, and waiting in line at the facility to arrange for shipment of the package. In many instances, a customer may not have the time or the means to generate a shipping label for the package or to travel to a shipping facility in order to have a shipping label generated.

Thus, there is a need in the art for methods, apparatuses, systems, and computer program products for allowing a customer to conveniently ship a package without requiring the customer to generate a shipping label for the package.

BRIEF SUMMARY OF THE INVENTION

Exemplary embodiments of the present invention provide improvements over the known prior art by, among other things, providing methods, apparatuses, systems, and computer program products for arranging for shipping a package without the customer needing to generate or apply a shipping label, or any other information, to the package. In particular, exemplary embodiments of the present invention enable a customer to use any mobile device, such as a smartphone, to capture a smart code associated with the package to be shipped, input shipping information related to shipment of the package, and transmit the smart code and shipping information to a carrier server. Subsequently, the customer need only leave the package at any carrier, or non-carrier, drop-off location or schedule pick-up of the package by a carrier. A representative of the carrier may then collect the package, capture the smart code associated with the package using a carrier device, transmit the smart code to a carrier server, and receive in response shipping information associated with the smart code. Once the shipping information is received, the carrier representative may generate and print a shipping label to be attached to the package. The package is then ready to be shipped without requiring further information from the customer or from the package.

According to one aspect of the present invention, a mobile device comprising at least one processor and at least one memory including computer program code is provided. In one embodiment, the at least one memory and the computer program code may be configured to, with the processor, cause the mobile device to at least (1) provide an interface for inputting shipping information associated with shipment of the package; (2) receive input of shipping information from a user; (3) capture an indication of a smart code associated with the package; and (4) transmit the shipping information and the smart code to a carrier server to be stored in association with each other.

In accordance with another aspect, a carrier server comprising at least one processor and at least one memory including computer program code is provided. In one embodiment, the at least one memory and the computer program code may be configured to, with the processor, cause the carrier server to at least (1) receive shipping information and an indication of a smart code associated with the package from a user device; (2) store at least one of the shipping information and the smart code; (3) link the shipping information to the smart code; (4) receive a request for shipping information for the package from a carrier device, wherein the request comprises an indication of the smart code associated with the package; (5) retrieve the shipping information associated with the package based at least in part on the smart code; and (6) transmit the shipping information to the carrier device.

In accordance with yet another aspect, a carrier device comprising at least one processor and at least one memory including computer program code is provided. In one embodiment, the at least one memory and the computer program code may be configured to, with the processor, cause the carrier device to at least (1) capture an indication of a smart code associated with the package; (2) transmit a request to a carrier server for shipping information associated with the package, wherein the request comprises an indication of the smart code; (3) receive the shipping information from the carrier server; and (4) generate a shipping label for the package based at least in part on the shipping information.

In accordance with still another aspect, a system for facilitating the shipment of a package, wherein the system comprises a carrier server and a carrier device. The carrier server may be configured to receive shipping information and an indication of a smart code associated with the package from a user device, store at least one of the shipping information and the smart code, and link the shipping information to the smart code. Additionally, the carrier device may be configured to capture an indication of a smart code associated with the package, and transmit a request to the carrier server for shipping information associated with the package, wherein the request comprises an indication of the smart code. The carrier server may be further configured to receive the request for shipping information from the carrier device, retrieve the shipping information associated with the package based at least in part on the smart code, and transmit the shipping information to the carrier device. In addition, the carrier device may be further configured to receive the shipping information from the carrier server, and generate a shipping label for the package based at least in part on the shipping information.

In accordance with still another aspect, a computer program product comprising at least one non-transitory computer-readable medium bearing computer program code embodied therein for use with a computer is provided. The computer program code comprises (1) code for providing an interface for inputting shipping information associated with shipment of the package; (2) code for receiving input of shipping information from a user; (3) code for capturing an indication of a smart code associated with the package; and (4) code for transmitting the shipping information and the smart code to a carrier server to be stored in association with each other.

In accordance with another aspect of the present invention, a method for facilitating the shipment of a package is provided. The method comprises (1) receiving shipping information and an indication of a smart code associated with the package from a user device; (2) storing at least one of the shipping information and the smart code; (3) linking the shipping information to the smart code; (4) receiving a request for shipping information for the package from a carrier device, wherein the request comprises an indication of the smart code associated with the package; (5) retrieving the shipping information associated with the package based at least in part on the smart code; and (6) transmitting the shipping information to the carrier device.

In accordance with yet another aspect, a method for facilitating the shipment of a package is provided. The method comprises (1) capturing an indication of a smart code associated with the package; (2) transmitting a request to a carrier server for shipping information associated with the package, wherein the request comprises an indication of the smart code; (3) receiving the shipping information from the carrier server; and (4) generating a shipping label for the package based at least in part on the shipping information.

BRIEF DESCRIPTION OF THE SEVERAL VIEWS OF THE DRAWING(S)

Reference will be made to the accompanying drawings, which are not necessarily drawn to scale, and wherein.

DETAILED DESCRIPTION

Figure 1:
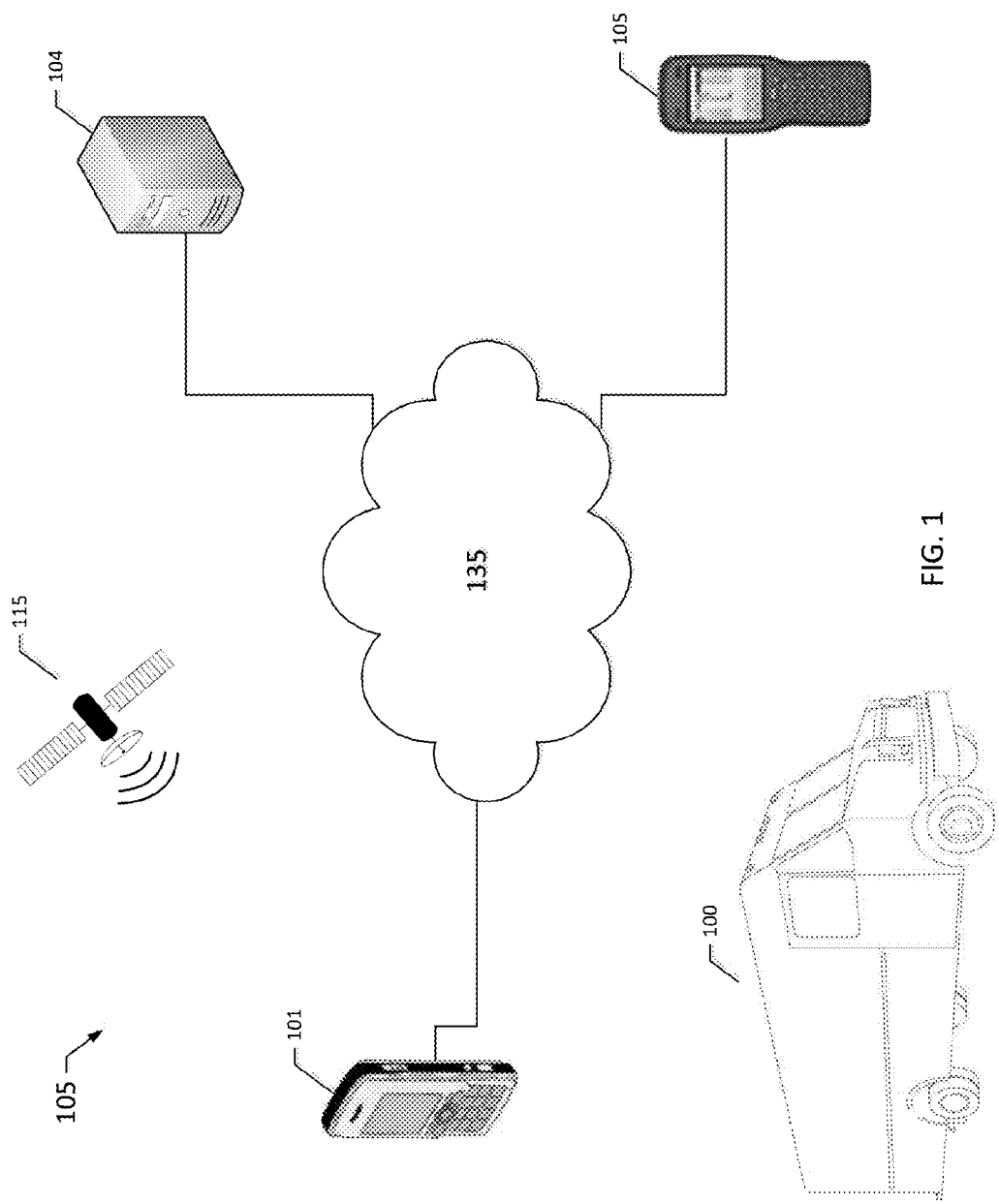
FIG. 1 is a block diagram of a system that can be used to practice various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Methods, Apparatus, Systems, and Computer Program Products

As should be appreciated, the embodiments may be implemented in various ways, including as methods, apparatus, systems, or computer program products. Accordingly, the embodiments may take the form of an entirely hardware embodiment or an embodiment in which a processor is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Particular embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. Exemplary System Architecture

FIG. 1 provides an illustration of a system architecture that can be used in conjunction with various embodiments of the present invention. As shown in FIG. 1, the system architecture may include one or more mobile devices 101. For instance, the mobile devices 101 may be smartphone devices, mobile telephones, mobile computers, portable digital assistants (PDAs), laptop computers, gaming devices, electronic tablets, and other types of similar electronic devices. In addition, in various embodiments, the mobile devices 101 may include digital imaging capabilities. For example, the mobile devices 101 may comprise a camera, barcode scanner, optical scanner, and/or the like.

The system 10 of FIG. 1 may further comprise one or more delivery vehicles 100, one or more carrier servers 104, one or more carrier devices 105, one or more Global Positioning System (GPS) satellites 115, one or more networks 135, and/or the like. Each of the components of the system 10 may be in electronic communication with (directly or indirectly), for example, one another over the same or different wireless or wired networks including, for example, a wired or wireless Personal Area Network (PAN), Local Area Network (LAN), Metropolitan Area Network (MAN), Wide Area Network (WAN), cellular network, or the like.

It should be noted that other system architectures are contemplated that may be used to practice various aspects of the invention. Thus, the system architecture provided in FIG. 1 is for illustrative purposes only and should not be construed to limit the scope of the invention. Further, while FIG. 1 illustrates certain system entities as separate, standalone entities, the various embodiments are not limited to this particular architecture.

a. Exemplary Mobile Device

Figure 2:
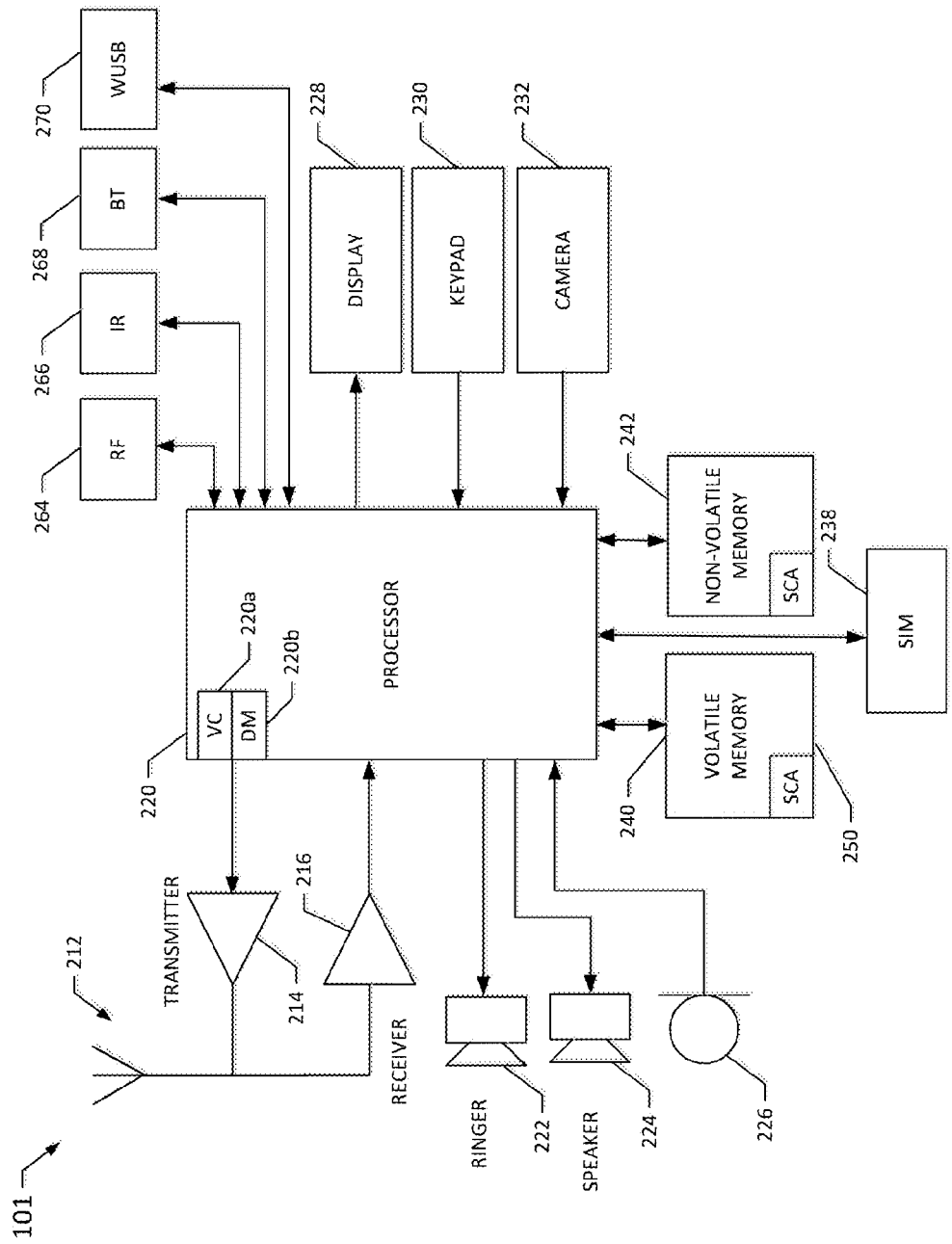
FIG. 2 is a schematic of a mobile device in accordance with certain embodiments of the present invention.

FIG. 2 provides a schematic diagram of a mobile device 101 according to one embodiment of the present invention. In this particular instance, the mobile device 101 is a smartphone. However, it should be understood that the mobile device 101 illustrated and hereinafter described is merely illustrative of one type of device that may implement and/or benefit from various embodiments and, therefore, should not be taken to limit the scope of the invention. Thus, it should be noted that other types of electronic devices, such as mobile telephones, mobile computers, portable digital assistants (PDAs), laptop computers, gaming devices, electronic tablets, and other types of similar electronic devices, may employ various embodiments of the invention.

As shown, the mobile device 101 may include an antenna 212 (or multiple antennas 212) in communication with a transmitter 214 and a receiver 216. The mobile device 101 may also include a processor 220 (e.g., application processor and/or graphics processor) configured to provide signals to and receive signals from the transmitter 214 and receiver 216, respectively.

The processor 220 may, for example, be embodied as various configurations including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 220 comprises a plurality of processors.

The signals sent and received by the processor 220 may include signaling information in accordance with an air interface standard of an applicable cellular system, and/or any number of different wireless networking techniques, comprising but not limited to Wi-Fi, wireless local access network (WLAN) techniques such as Bluetooth™ (BT), Ultra-wideband (UWB), Institute of Electrical and Electronics Engineers (IEEE) 802.11, 802.16, and/or the like. In addition, these signals may include speech data, user generated data, user requested data, and/or the like.

In this regard, the mobile device 101 may be capable of operating with one or more air interface standards, communication protocols, modulation types, access types, and/or the like. More particularly, the mobile device 101 may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile device 101 may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile device 101 may be capable of operating in accordance with 2.5G wireless communication protocols General Packet Radio Service (GPRS), Enhanced Data GSM Environment (EDGE), and/or the like. Further, for example, the mobile device 101 may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile device 101 may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile device 101 may be capable of operating in accordance with fourth-generation (4G) wireless communication protocols such as LTE Advanced and/or the like as well as similar wireless communication protocols that may be developed in the future.

Some Narrow-band Advanced Mobile Phone System (NAMPS), as well as Total Access Communication System (TACS), mobile devices 101 may also benefit from embodiments of this invention, as should dual or higher mode phones (for example, digital/analog or TDMA/CDMA/analog phones). Additionally, the mobile device 101 may be capable of operating according to Wi-Fi or Worldwide Interoperability for Microwave Access (WiMAX) protocols.

It is understood that the processor 220 may comprise circuitry for implementing audio/video and logic functions of the mobile device 101. For example, the processor 220 may comprise a digital signal processor device, a microprocessor device, an analog-to-digital converter, a digital-to-analog converter, and/or the like. Control and signal processing functions of the mobile device 101 may be allocated between these devices according to their respective capabilities. Additionally, the processor 220 may comprise an internal voice coder (VC) 220a, an internal data modem (DM) 220b, and/or the like. Further, the processor 220 may comprise functionality to operate one or more software programs, which may be stored in memory. For example, the processor 220 may be capable of operating a connectivity program, such as a web browser. The connectivity program may allow the mobile device 101 to transmit and receive web content, such as location-based content, according to a protocol, such as Wireless Application Protocol (WAP), hypertext transfer protocol (HTTP), and/or the like. The mobile device 101 may be capable of using a Transmission Control Protocol/Internet Protocol (TCP/IP) to transmit and receive web content across the internet or other networks.

The mobile device 101 may also comprise a user interface including, for example, an earphone or speaker 224, a ringer 222, a microphone 226, a display 228, a camera 232, a user input interface, and/or the like, which may be operationally coupled to the processor 220. In this regard, the processor 220 may comprise user interface circuitry configured to control at least some functions of one or more elements of the user interface, such as, for example, the speaker 224, the ringer 222, the microphone 226, the display 228, the camera 232, and/or the like. The processor 220 and/or user interface circuitry comprising the processor 220 may be configured to control one or more functions of one or more elements of the user interface through computer program instructions (for example, software and/or firmware) stored on memory accessible to the processor 220 (for example, volatile memory 240, non-volatile memory 242, and/or the like). Although not shown, the mobile device 101 may comprise a battery for powering various circuits related to the mobile device 101, for example, a circuit to provide mechanical vibration as a detectable output. The user input interface may comprise devices allowing the mobile device 101 to receive data, such as a keypad 230, a touch display (not shown), a joystick (not shown), and/or other input device. In embodiments including a keypad, the keypad may comprise numeric (0-9) and related keys (#, *), and/or other keys for operating the mobile device 101.

As shown in FIG. 2, the mobile device 101 may also include one or more components for sharing and/or obtaining data. For example, the mobile device 101 may comprise a short-range radio frequency (RF) transceiver and/or interrogator 264 so data may be shared with and/or obtained from electronic devices in accordance with RF techniques. The mobile device 101 may comprise other short-range transceivers, such as, for example, an infrared (IR) transceiver 266, a Bluetooth™ (BT) transceiver 268 operating using Bluetooth™ brand wireless technology developed by the Bluetooth™ Special Interest Group, a wireless universal serial bus (USB) transceiver 270 and/or the like. The Bluetooth™ transceiver 268 may be capable of operating according to low power or ultra-low power Bluetooth™ technology (for example, Wibree™) radio standards. In this regard, the mobile device 101 and, in particular, the short-range transceiver may be capable of transmitting data to and/or receiving data from electronic devices within a proximity of the mobile device 101, such as within 10 meters, for example. Although not shown, the mobile device 101 may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The mobile device 101 may comprise memory, such as a subscriber identity module (SIM) 238, a removable user identity module (R-UIM), and/or the like, which may store information elements related to a mobile subscriber. In addition to the SIM 238, the mobile device 101 may comprise other removable and/or fixed memory. The mobile device 101 may include volatile memory 240 and/or non-volatile memory 242. For example, volatile memory 240 may include Random Access Memory (RAM) including dynamic and/or static RAM, on-chip or off-chip cache memory, and/or the like. Non-volatile memory 242, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 240, non-volatile memory 242 may include a cache area for temporary storage of data. The memories may store one or more applications (e.g., software programs), instructions, pieces of information, data, and/or the like which may be used by the mobile device 101 for performing functions of the mobile device 101. For instance, as described in greater detail below, one or more of the memories on the device 101 may store a smart code application 250 in various embodiments that performs various aspects of the claimed invention.

b. Exemplary Carrier Server

Figure 3:
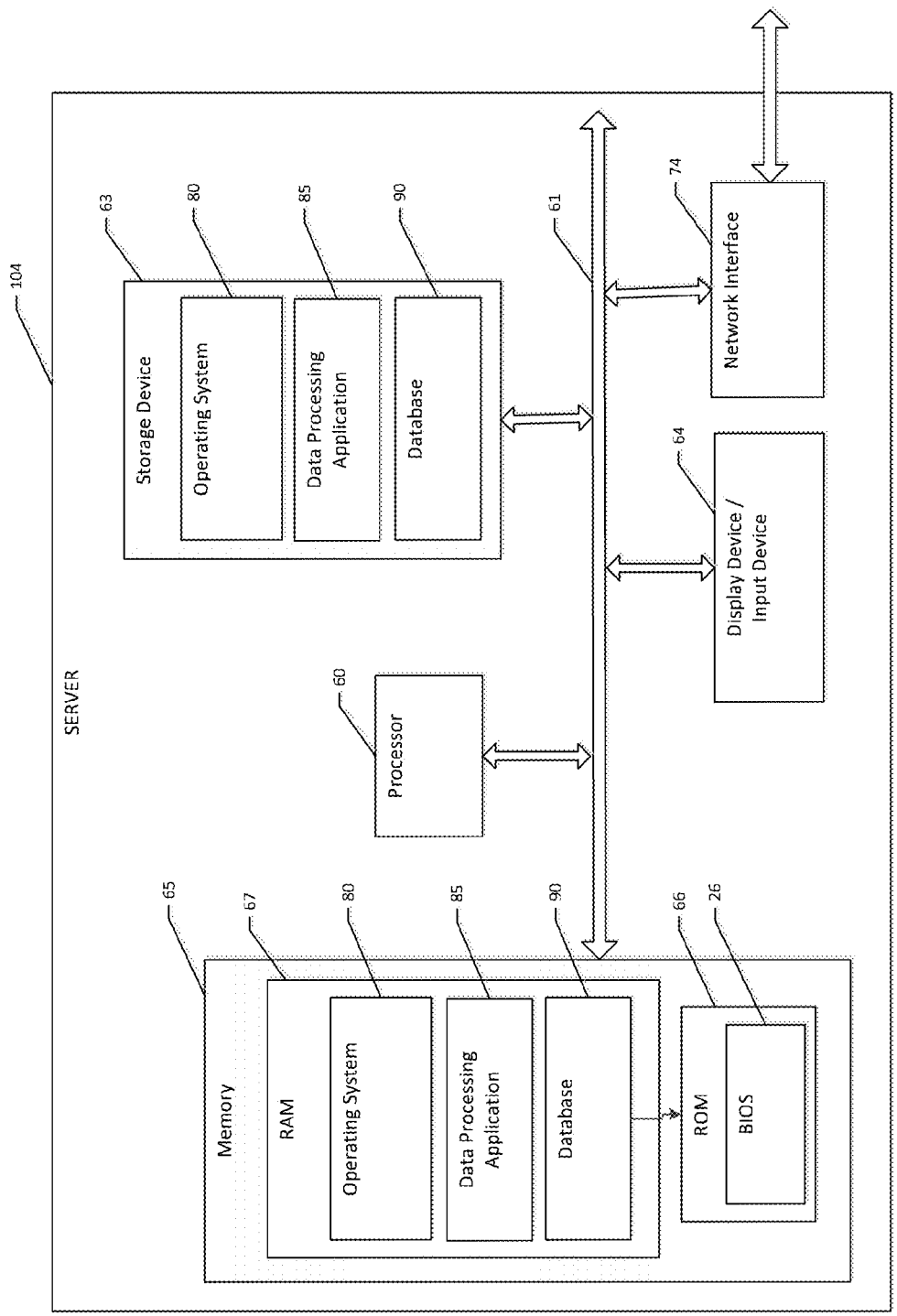
FIG. 3 is a schematic of a carrier server in accordance with certain embodiments of the present invention.

FIG. 3 provides a schematic of a carrier server 104 according to one embodiment of the present invention. In general, the term "server" may refer to, for example, any computer, computing device, mobile phone, desktop, notebook or laptop, distributed system, server, blade, gateway, switch, processing device, or combination of processing devices adapted to perform the functions described herein. As will be understood from this figure, in one embodiment, the carrier server 104 may include a processor 60 that communicates with other elements within the carrier server 104 via a system interface or bus 61. The processor 60 may be embodied in a number of different ways. For example, the processor 60 may be embodied as one or more processing elements, one or more microprocessors with accompanying digital signal processors, one or more processors without accompanying digital signal processors, one or more coprocessors, one or more multi-core processors, one or more controllers, and/or various other processing devices including integrated circuits such as, for example, an application specific integrated circuit (ASIC), a field programmable gate array (FPGA), a hardware accelerator, and/or the like.

In an exemplary embodiment, the processor 60 may be configured to execute instructions stored in the device memory or otherwise accessible to the processor 60. As such, whether configured by hardware or software methods, or by a combination thereof, the processor 60 may represent an entity capable of performing operations according to embodiments of the present invention when configured accordingly. A display device/input device 64 for receiving and displaying data may also be included in or associated with the carrier server 104. The display device/input device 64 may be, for example, a keyboard or pointing device that is used in combination with a monitor. The carrier server 104 may further include transitory and non-transitory memory 65, which may include both random access memory (RAM) 67 and read only memory (ROM) 66. The carrier server's ROM 66 may be used to store a basic input/output system (BIOS) 26 containing the basic routines that help to transfer information to the different elements within the carrier server 104.

In addition, in one embodiment, the carrier server 104 may include at least one storage device 63, such as a hard disk drive, a CD drive, a DVD drive, and/or an optical disk drive for storing information on various computer-readable media. The storage device(s) 63 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, and/or the like. Additionally, each of these storage devices 63 may be connected to the system bus 61 by an appropriate interface.

Furthermore, a number of executable instructions, applications, scripts, program modules, and/or the like may be stored by the various storage devices 63 and/or within RAM 67. Such executable instructions, applications, scripts, program modules, and/or the like may include an operating system 80 and a data processing application 85. As discussed in greater detail below, this application 85 may control certain aspects of the operation of the carrier server 104 with the assistance of the processor 60 and operating system 80, although its functionality need not be modularized. In addition to the program modules, the carrier server 104 may store and/or be in communication with one or more databases, such as database 90.

Also located within and/or associated with the carrier server 104, in one embodiment, is a network interface 74 for interfacing with various computing entities. This communication may be via the same or different wired or wireless networks (or a combination of wired and wireless networks), as discussed above. For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), and/or any other wired transmission protocol. Similarly, the carrier server 104 may be configured to communicate via wireless external communication networks using any of a variety of protocols, such as 802.11, GSM, EDGE, GPRS, UMTS, CDMA2000, WCDMA, TD-SCDMA, LTE, E-UTRAN, Wi-Fi, WiMAX, UWB, NAMPS, TACS and/or any other wireless protocol.

It will be appreciated that one or more of the carrier server's 104 components may be located remotely from other carrier server 104 components. Furthermore, one or more of the components may be combined and additional components performing functions described herein may be included in the carrier server 104.

c. Exemplary Carrier Device

Figure 4:
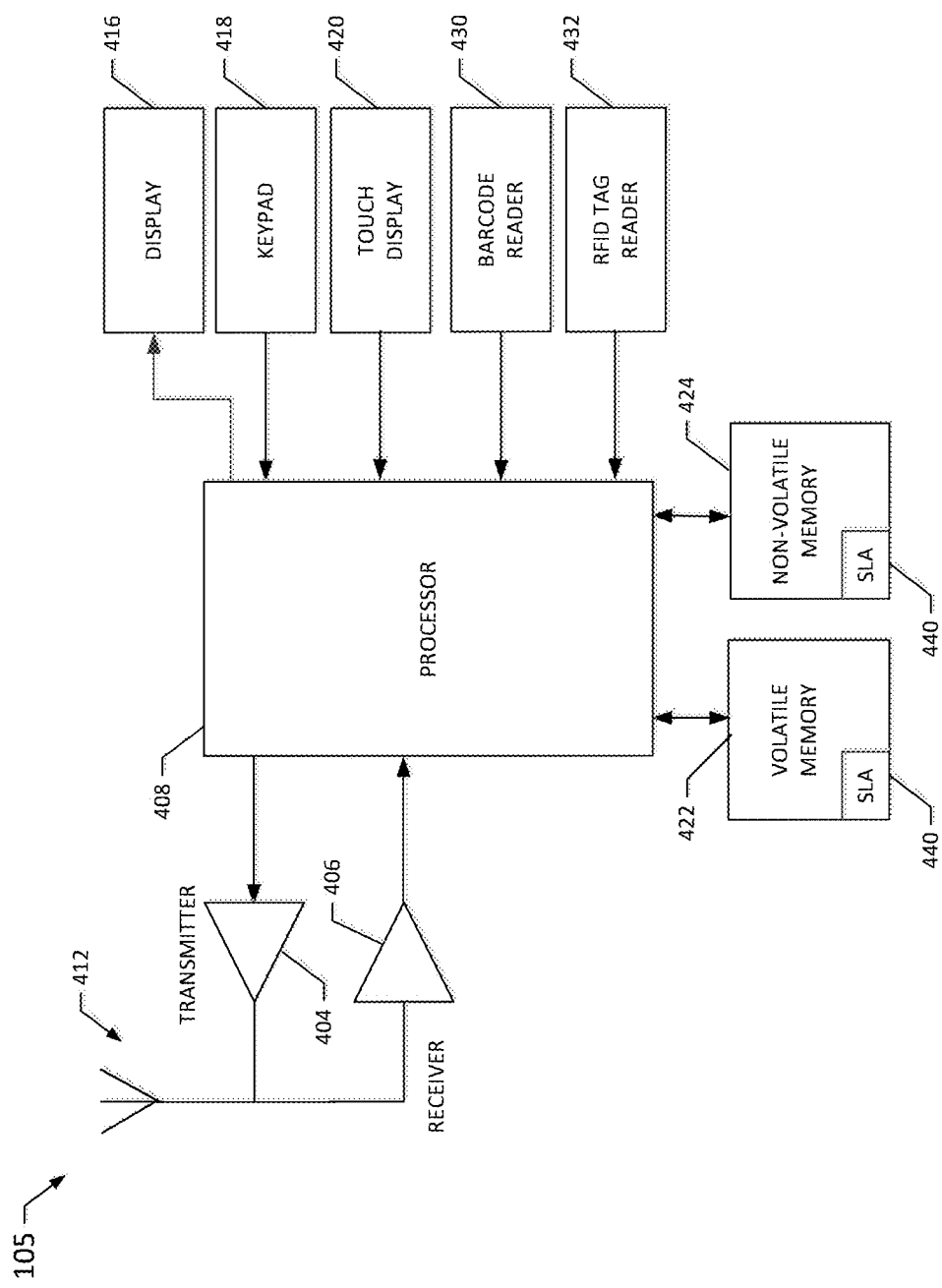
FIG. 4 is a schematic of a carrier device in accordance with certain embodiments of the present invention.

With respect to the carrier device 105, FIG. 4 provides an illustrative schematic representative of a carrier device 105 that can be used in conjunction with the embodiments of the present invention (e.g., a carrier device 105 carried by an operator of a delivery vehicle 100). In some embodiments, a carrier device 105 may be configured to comprise any or all of the hardware and provide some or all of the functionality described above with regard to the example mobile device 101 of FIG. 2. In example embodiments, the carrier device 105 may be a Delivery Information Acquisition Device (DIAD), such as that used by United Parcel Service (UPS®). As shown in FIG. 4, the carrier device 105 may comprise an antenna 412, a transmitter 404, a receiver 406, and a processing device 408, e.g., a processor, controller, and/or the like, that provides signals to and receives signals from the transmitter 404 and receiver 406, respectively.

The signals provided to and received from the transmitter 404 and the receiver 406, respectively, may include signaling information in accordance with an air interface standard of applicable wireless (or wired) systems. In this regard, the carrier device 105 may be capable of operating with one or more air interface standards, communication protocols, modulation types, and access types. More particularly, the carrier device 105 may operate in accordance with any of a number of second-generation (2G) communication protocols, third-generation (3G) communication protocols, and/or the like. Further, for example, the carrier device 105 may operate in accordance with any of a number of different wireless networking techniques, such as GPRS, GSM, EDGE, UMTS, CDMA2000, WCDMA, TD-SCDMA, LTE, E-UTRAN, Wi-Fi, WiMAX, UWB, NAMPS, TACS, and/or any other wireless protocol. Via these communication standards and protocols, the carrier device 105 can communicate with the carrier server 104 and/or various other entities.

The carrier device 105 may also comprise a user interface (that can include a display 416 coupled to a processing device 408) and/or a user input interface (coupled to the processing device 408). The user input interface can comprise any of a number of devices allowing the carrier device 105 to receive data, such as a keypad 418, a touch display 420, barcode reader 430, RFID tag reader 432, and/or other input device. In embodiments including a keypad 418, the keypad 418 can include the conventional numeric (0-9) and related keys (#, *), and other keys used for operating the carrier device 105 and may include a full set of alphabetic keys or set of keys that may be activated to provide a full set of alphanumeric keys. In addition to providing input, the user input interface can be used, for example, to activate and/or deactivate certain functions, such as screen savers and/or sleep modes. Although not shown, the carrier device 105 may also include a battery, such as a vibrating battery pack, for powering the various circuits that are required to operate the carrier device 105, as well as optionally providing mechanical vibration as a detectable output. The carrier device 105 may further include a printing device that may be utilized for printing various items, such as shipping labels and/or receipts.

The carrier device 105 can also include volatile memory 422 and/or non-volatile memory 424, which can be embedded or may be removable. For example, the non-volatile memory may be embedded or removable MMCs, SD memory cards, Memory Sticks, EEPROM, flash memory, hard disk, and/or the like. The memory can store any of a number of pieces or amount of information and data used by the carrier device 105 to implement the functions of the carrier device 105. The memories may store one or more applications (e.g., software programs), instructions, pieces of information, data, and/or the like which may be used by the carrier device 105 for performing functions of the carrier device 105. For instance, as described in greater detail below, one or more of the memories on the carrier device 105 may store a shipping label application 440 in various embodiments that performs various aspects of the claimed invention. The carrier device 105 may also include a GPS module adapted to acquire, for example, latitude, longitude, altitude, geocode, course, speed, universal time (UTC), date, and/or telematics information/data. In one embodiment, the GPS module acquires data, sometimes known as ephemeris data, by identifying the number of satellites in view and the relative positions of those satellites.

III. Exemplary System Operation

According to various embodiments, a user may desire to ship a package from a location and/or at a time when the user may not be able to generate and apply a shipping label. That is, a user may need to ship a package from a location other than a carrier facility where shipping labels can be generated and printed. For example, a user may be at a hotel and need to drop off a package for shipment before departing. In another example, a user may go to a carrier facility but not have time to wait in line for a representative to assist with preparing and printing a shipping label. In either instance, the user may utilize a mobile device 101 and a package or pre-printed label having an associated smart code to both provide shipping information to the shipper and associate that shipping information with the package. The user may then simply drop off the package at a particular location where the carrier may collect the package, capture the smart code to retrieve the associated shipping data, prepare and affix a shipping label based on the shipping information, and continue shipping the package. Various embodiments of the present invention will be described in greater detail below with reference to FIGS. 5-7.

According to example embodiments, a user may obtain a package having an associated smart code for use in shipping an item. It should be noted that the term "package" or "package material" may also refer to an envelope, bag, box, freight, or any other container or receptacle used to ship an item. The carrier may, in certain instances, provide the packages with associated smart codes to the user. For example, the carrier may make available a number of envelopes (e.g. express shipping envelopes), shipping forms (e.g., Air Shipping Documents), and/or the like with pre-associated smart codes at one or more carrier facilities. As another example, the carrier may distribute the packages with pre-associated smart codes at package drop-off or collection locations. The user may retain a number of packages having pre-associated smart codes for future shipping needs. In this way, a user may keep various smart code packages at certain locations (e.g., at home, at the office, in the car, etc.) to avoid the need to travel to a carrier facility each time they wish to ship an item.

In other embodiments, the carrier may provide one or more pre-printed labels comprising an indication of a smart code to be associated with a package. In this regard, a user may apply the smart code label to any package, even those not provided by a carrier. The carrier may make the pre-printed smart code labels available at various carrier facilities, drop-off locations, and/or the like. Similar to embodiments employing the smart code packages, a user may obtain a number of smart code labels that can be stored in various locations or kept with the user to enable the user to have access to the smart code labels at any time. It should be understood that the following embodiments described below with respect to smart code packages may similarly be implemented using smart code labels affixed to packages. In some embodiments, the smart code packages may simply be packages with pre-applied smart code labels.

As previously indicated, the package of various embodiments may comprise an indication of a smart code. The smart code may be represented by a barcode, MaxiCode, Quick Response (QR) code, optical code, and/or the like. In some embodiments, the smart code may be associated with any other type of code or label that may be associated with a package, such as a Radio Frequency Identification (RFID) tag, an electronic sensor, and/or the like. In some instances, the smart code may additionally or alternatively contain numeric or alphanumeric text or other forms of text. For example, the same smart code may be represented by both a machine-readable optical code and its human-readable numeric or alphanumeric text string equivalent. In other examples, the smart code may be represented by a combination of the machine-readable optical code and the human-readable numeric or alphanumeric text string. According to example embodiments, the smart code may comprise one or more check digits or parity bits. In this regard, a function (e.g., a checksum function, hash function, and/or the like) may be applied to the smart code to verify its validity.

In various embodiments, the smart code may be used to uniquely identify the package with which it is associated. The smart code representation associated with the package may be distinguishable from other optical codes that may be associated with a package, even in an instance in which the other optical code is of the same type as the smart code representation. For example, a package may at some point during shipment contain two MaxiCodes, one associated with the smart code and one associated with the shipping label. In this example, the smart code MaxiCode may be encoded in such a way so that it may be differentiated from the shipping label MaxiCode, such as by encoding the two MaxiCodes according to different MaxiCode modes. In this regard, the information encoded in the smart code MaxiCode may not cause confusion in the downstream shipping process because it may be easily distinguished from the shipping label MaxiCode.

a. Exemplary Mobile Device Operation

Figure 5:
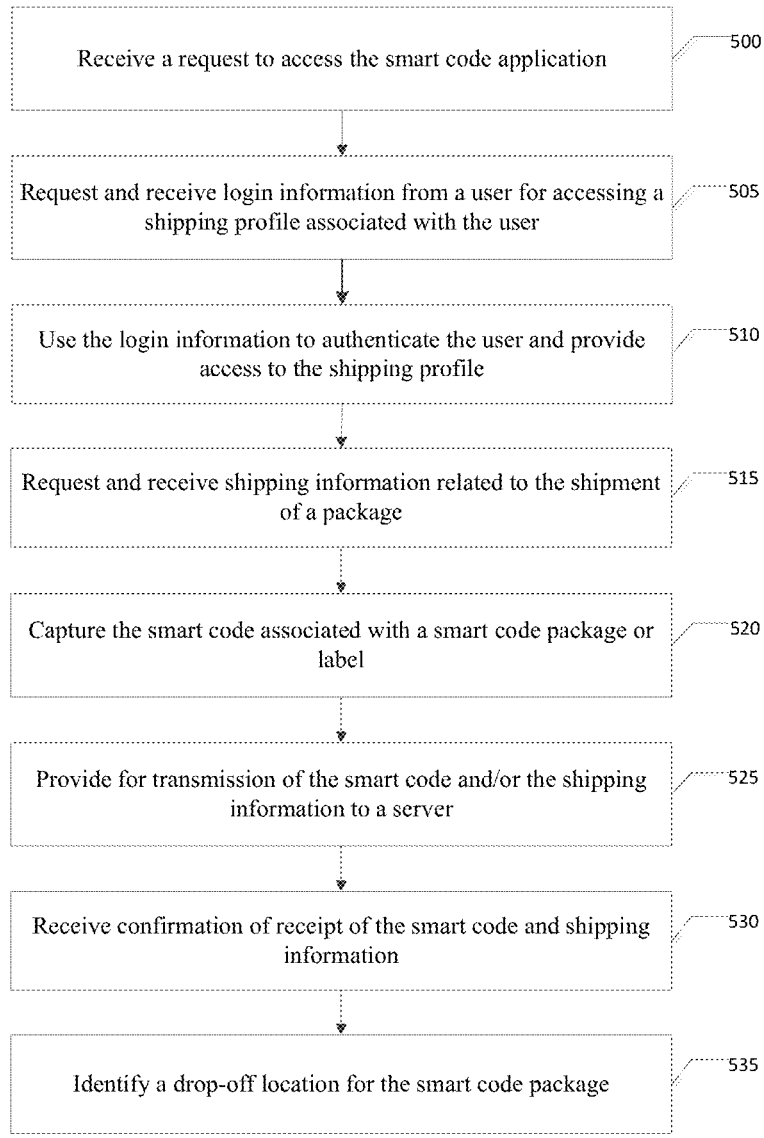
FIGS. 5-7 are flowcharts illustrating operations and processes that can be used in accordance with various embodiments of the present invention.

As previously discussed, in various embodiments, the mobile device 101 may include a smart code application 250 configured to perform various functions of the claimed invention. FIG. 5 illustrates a flowchart of exemplary functionality of the smart code application 250 for allowing a user to use a mobile device 101 along with a package or label having an associated smart code to provide shipping information for the package so that the package may be collected and delivered without the user applying a shipping label, according to various embodiments. This flowchart may correspond to the operations carried out by the processor 220 of the mobile device 101 shown in FIG. 2 as the processor 220 executes the smart code application 250 according to various embodiments. In other embodiments, a fixed, or non-mobile, device may be used in place of or in addition to the mobile device 101 to perform one or more of the functions in the embodiments described below with respect to a mobile device 101.

In operation 500, the mobile device 101 may be configured to receive a request to access the smart code application 250. It should be understood that the term "smart code application 250" may refer to a web page (e.g., an HTML web page or Mobile Web page), web application (e.g., a Java™ applet or JavaScript application), mobile application (e.g., a smartphone app), and/or the like that may be accessed by a user via a mobile device 101. In instances in which the smart code application 250 is embodied as a web page or web applications, the mobile device 101 may receive user input in the form of a web address (e.g., a URL). In other instances in which the smart code application 250 is embodied as a mobile application, the mobile device 101 may receive an input selecting the mobile application from a list of available mobile applications. In these instances, the mobile device 101 may receive a request from a user to download and install the mobile application prior to receiving a selection of the mobile application.

According to example embodiments, the user may receive information related to the smart code application 250 from the carrier. In certain embodiments, the carrier may indicate to a user the address of the web page or web application (i.e., URL) and/or the name or download address of the mobile application by associating an indication of the address or name with the smart code package. For example, the smart code representation associated with the smart code package may further comprise an encoded indication of a link to the web page/web application address or mobile application name. In another example, the address or name may be printed on the smart code package or label separate from the encoded portion of the smart code. The carrier may, in yet another example, advertise the web page/web application address or mobile application name at a location where smart code packages are made available, such as at a drop-off location or carrier facility. For instance, a receptacle at a drop-off location may include an advertising code (e.g., barcode, MaxiCode, and/or the like) that may be scanned using the mobile device 101. In these instances, once the mobile device 101 scans the advertising code, the mobile device 101 may either automatically navigate to the web page/web application for entering shipping information or automatically launch the mobile application. The mobile device 101 may also download and install the mobile application prior to launching in instances in which the mobile application is not yet loaded on the mobile device 101.

In operation 505, the smart code application 250 may request and receive login information from a user for accessing a shipping profile associated with the user. In this regard, a user may have previously created a shipping profile and established a login and password for the profile. In embodiments where a user does not yet have a shipping profile, the smart code application 250 may request information from a user to create a new shipping profile. The smart code application 250, in operation 510, may use the login information to authenticate the user and provide access to the shipping profile. For example, the smart code application 250 may transmit the login information to an authentication server (e.g., the carrier server 104). In response to (e.g., after) transmitting the login information, the smart code application 250 may be configured to receive authentication information and/or shipping profile information from the server. The smart code application 250 may temporarily store the received shipping profile information and/or display the shipping profile information to the user.

In operation 515, the smart code application 250 may request and receive shipping information related to the shipment of a package. For example, the smart code application 250 may provide an interface to the user where the user may input shipping information. The requested shipping information may comprise information related to the user shipping the package (e.g., name, work address, company, home address, country, phone number(s), email address(es), and/or the like), information related to the recipient of the package (e.g., name, destination address, indication of business or residence, company, country, phone number(s), email address(es), and/or the like), information related to the payer (e.g., name, customer account number, invoice number, reference number, credit or debit card information, billing address, and/or the like), information related to the package itself (e.g., package type, weight, dimensions, declared value, insurance information, number of packages, and/or the like), information related to shipment of the package (e.g., drop-off location, pick-up location, service type (e.g., same day, next day, two day, three day, express, priority, ground, first class, second class, and/or the like), shipping date, and/or the like), and/or any other information related to shipping a package. In some embodiments, the smart code application 250 interface may allow a user to request and/or schedule pick-up of the package to be shipped.

In example embodiments, the smart code application 250 may provide for storage of the input shipping information, for example in the user's shipping profile. In this regard, the smart code application 250 may be configured to store in the user's shipping profile any of the shipping information referenced above so that a user does not need to re-enter information each time the user wishes to prepare a package for shipment. For example, the smart code application 250 may store the user's address and payment information and/or one or more contacts for commonly used recipients in the shipping profile. The smart code application 250 may, in certain instances, store various user preferences, such as preferred shipping method, preferred payment method, and/or the like, in the shipping profile. In some embodiments, the smart code application 250 may associate one or more preferences with one or more stored contacts in the shipping profile. For example, the smart code application 250 may store a preferred shipping method when shipping to a particular recipient. The smart code application 250 may be configured to store the user profile information locally (e.g., on the mobile device 101) or remotely (e.g., on the carrier server 104).

In operation 520, the smart code application 250 may be configured to capture the smart code associated with a smart code package or label. In some embodiments, the smart code application 250 may utilize the camera of the mobile device 101 to capture a photograph of the smart code representation associated with the package to be shipped. In other embodiments, the mobile device 101 may comprise a barcode scanner or other optical scanning device, which the smart code application 250 may use to capture the smart code. The smart code application 250 may be configured to decode the smart code from the encoded smart code representation associated with the package scanned by the mobile device 101. In other embodiments, the smart code may remain encoded in the smart code application 250 after being captured. According to embodiments where the smart code representation is associated with a smart code label rather than a smart code package, the user may associate the smart code label with the package (e.g., affix the label to the package) prior to or after capturing the smart code from the label.

According to certain embodiments, the smart code application 250 may capture the smart code prior to any of the other operations described above. For example, the smart code application 250 may capture the smart code from the package prior to receiving the shipping information associated with the package from the user. In some embodiments, the user may scan or capture the smart code representation using the mobile device 101 prior to accessing the smart code application 250. In these instances, the mobile device 101 may automatically open or launch the smart code application 250 in response to (e.g., after) capturing the smart code representation.

In operation 525, the smart code application 250 may provide for transmission of the smart code and/or the shipping information to a server (e.g., the carrier server 104). In this regard, the smart code application 250 may provide the smart code and shipping information so that they may be associated together at the server. The smart code may be either encoded or decoded when it is provided to the server by the smart code application 250.

In operation 530, the smart code application 250 may optionally receive confirmation of receipt of the smart code and shipping information. In some embodiments, the confirmation may provide an additional verification number (e.g., a confirmation number or customer number). In these embodiments, the smart code application 250 may display the verification number so that it may be associated with the smart code package to be shipped. For example, the smart code application 250 may receive a verification number that is distinct from the smart code, display the verification number to the user, and the user may write the verification number on the smart code package. The verification number may be used as an error check or confirmation later in the shipping process. In other embodiments, the user may not need to associate any further information with the smart code package once the smart code application 250 transmits the smart code and shipping information to the server.

In operation 535, the smart code application 250 may identify a drop-off location for the smart code package. In some embodiments, the smart code application 250 may utilize the geolocation services of the mobile device 101 to determine the current location of the user, for example by receiving data from one or more GPS satellites 115. The smart code application 250 may use the current location of the user to access information about nearby drop-off locations, for example by requesting the drop-off location information from the network or from a server (e.g., carrier server 104).

The user may, in certain embodiments, leave the package at a public location not associated with a drop-off point (e.g., a hotel front desk, an airport terminal kiosk, and/or the like). In this regard, the smart code application 250 may provide the location information (e.g., geolocation information) of the mobile device 101 to the carrier server 104 so that the carrier may schedule a pick-up at or near the location. In these embodiments, the smart code application 250 may request additional information from the user related to the drop-off point (e.g., a description of the drop-off location or a photo of the drop-off location). The smart code application 250 may transmit all or part of the drop-off location information to a server (e.g., the carrier server 104) to provide sufficient information for the carrier to locate and collect the package for shipment.

In the embodiments described above with respect to the exemplary mobile device 101 operations performed by the smart code application 250, the user may not be required to write anything on or apply anything to the package to be shipped, aside from applying the smart code label in instances in which the smart code is not pre-associated with the package. That is, the user may simply scan the smart code representation pre-associated with the package using the mobile device 101, enter the shipping information for the package into the smart code application 250 on the mobile device 101, and send the smart code and shipping information to the carrier (e.g., carrier server) via the smart code application 250. At this point, the user need only drop off the package for collection by the carrier, who will later apply a shipping label to the package using the smart code and shipping information sent to the carrier and associated with the package.

It should be noted that the operations described above with respect to the mobile device 101 may be performed with a non-mobile device. For example, a user may capture the smart code representation using any device (e.g., barcode scanner, camera, and/or the like), transfer the smart code representation to a non-mobile device (e.g., a desktop computer having a network connection), and input the shipping information on a smart code application 250 operating on the non-mobile device. The smart code application 250 on the non-mobile device may then transmit the smart code and/or shipping information to a server (e.g., the carrier server 104).

b. Exemplary Carrier Server Operations

Figure 6:
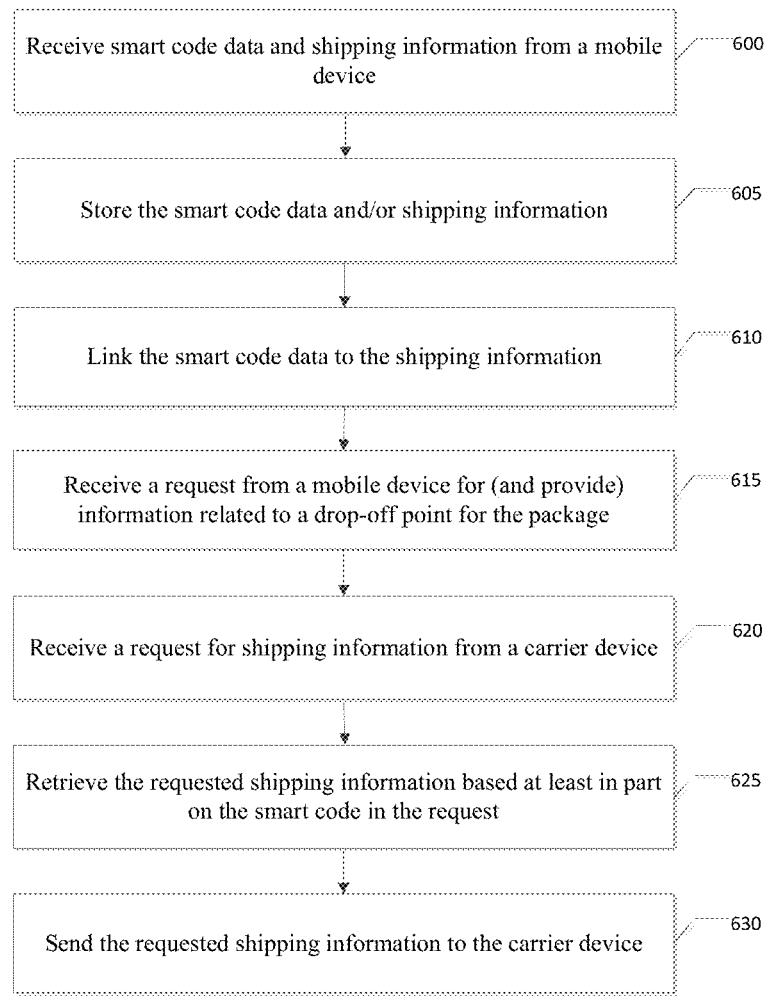

In various embodiments, the common carrier's system may include one or more carrier servers 104 configured to perform various functions of the claimed invention. For instance, the carrier's system may include a carrier server 104 that includes a data processing application 85 for processing the data received from smart code application 250s operating on one or more mobile devices 101 as well as other information received for the corresponding packages to be shipped. FIG. 6 illustrates a flowchart of the functionality of the data processing application 85 for processing smart code data and shipping information for a package received from a user's mobile device 101, according to various embodiments. This flowchart may correspond to the steps carried out by the processor 60 of the server 104 shown in FIG. 3 as the processor 60 executes the data processing application 85 according to various embodiments.

In operation 600, the data processing application 85 may be configured to receive smart code data and shipping information from a mobile device 101. The shipping information may comprise any information related to the shipment of a package, including any or all of the shipping information described above with respect to FIG. 5. The smart code data may comprise an encoded or unencoded representation of a smart code uniquely associated with a package to be shipped. For example, the smart code data may comprise an indication of a unique numeric or alphanumeric code used to identify a particular package. In an embodiment in which the smart code received is encoded, the data processing application 85 may be configured to decode the smart code. In certain embodiments, the data processing application 85 may verify that the smart code received is a valid smart code. The data processing application 85, according to example embodiments, may send the mobile device 101 a confirmation number signifying that the information has been received such that, in some instances, the user of the mobile device 101 may associate the confirmation number with the package for future verification purposes described below.

In operation 605, the data processing application 85 may be configured to store the smart code data and/or shipping information. For example, the data processing application 85 may be configured to store the smart code data and/or shipping information in one or more storage devices (e.g., database 90). In some embodiments, a list of all smart codes may be maintained by the data processing application 85, for example in the database 90. In these embodiments, the data processing application 85 may not store the received smart code data, which may be redundant to the previously stored smart codes. Rather, the data processing application 85 may simply store the shipping information so that it may be later linked to a previously stored smart code. According to certain embodiments, the smart code data may be maintained in a first storage device and the shipping information may be maintained in a second (i.e., separate) storage device.

In operation 610, the data processing application 85 may link the smart code data to the shipping information. For example, the data processing application 85 may be configured to store the smart code data and shipping information together in a storage device (e.g., database 90) so that they are linked or mapped to one another. In another example, the data processing application 85 may be configured to store the smart code data and shipping information separately but linked together, for instance by a mapping. According to embodiments where all smart codes are maintained in a storage device by the data processing application 85, the data processing application 85 may be configured to associate with the particular smart code associated with the smart code data a link or mapping to the received shipping information.

In operation 615, the data processing application 85 may receive a request from a mobile device 101 for information related to a drop-off point for the package associated with the smart code data and shipping information. For example, the request may comprise an indication of the location of the mobile device 101 or package, as explained above with respect to operation 535 of FIG. 5. The data processing application 85 may utilize the location information to determine one or more package drop-off locations (e.g., carrier facilities, drop boxes, and/or the like) proximate the location provided. In some embodiments, the data processing application 85 may provide information related to the drop-off locations to the mobile device 101. For example, the data processing application 85 may provide address information, map information (e.g., location coordinates, web page links to mapping services, map images, and/or the like), hours of operation, pick-up times, directions to the drop-off location from the location of the mobile device 101 or package, and/or the like.

According to some embodiments, the data processing application 85 may be configured to locate one or more delivery vehicles 100 proximate the location of the mobile device 101 or package that may be able to collect the package for delivery. In this regard, the data processing application 85 may be configured to schedule pick-up of the package at a location at or near the location of the mobile device 101 or package. The data processing application 85 may receive scheduling information from the mobile device 101, for example in an instance in which the user has a preferred pick-up time or location, to assist the data processing application 85 in scheduling the pick-up. In these embodiments, the data processing application 85 may provide a response to the mobile device 101 indicating that a pick-up has been scheduled and, in certain instances, providing information related to the scheduled pick-up service.

In operation 620, the data processing application 85 of the carrier server 104 may be configured to receive a request for shipping information from a carrier device 105. In this regard, the request may comprise an indication of a smart code (e.g., an encoded or unencoded smart code representation) associated with the package for which shipping information is requested. As in operation 600, in embodiments in which the smart code received is encoded, the data processing application 85 may be configured to decode the smart code. In various embodiments, the data processing application 85 may verify that the smart code received is a valid smart code. For example, the data processing application 85 may apply a checksum function or hash function to the smart code, in some instances based on a check digit or parity bit included in the smart code.

In operation 625, the data processing application 85 may retrieve the requested shipping information based at least in part on the smart code in the request. The request may, in certain instances, request only a subset of the available shipping information associated with the smart code. In some embodiments, the data processing application 85 may perform a lookup in a shipping information database (e.g., database 90) using the smart code. In other embodiments, the data processing application 85 may locate the received smart code in a database, obtain a mapping to the shipping information stored in association with the smart code, and retrieve the shipping information based on the mapping. It should be noted that any number of methods for retrieving the requested shipping information using the received smart code data may be used without departing from the scope of the invention, at least due to the various ways the data processing application 85 may be configured to store and link the smart code with the shipping data in operations 605 and 610.

In operation 630, the data processing application 85 may send the requested shipping information to the carrier device 105. In some embodiments, the data processing application 85 may include a confirmation number associated with the shipping information to use in verifying the package. For example, the user may have been given a confirmation number when providing the shipping information for the package and associated the confirmation number with the package prior to dropping off the package for delivery. In this example, the operator of the carrier device 105 may retrieve the shipping information including the confirmation number and verify that the received confirmation number matches the confirmation number associated with the package by the user.

c. Exemplary Carrier Device Operations

Figure 7:
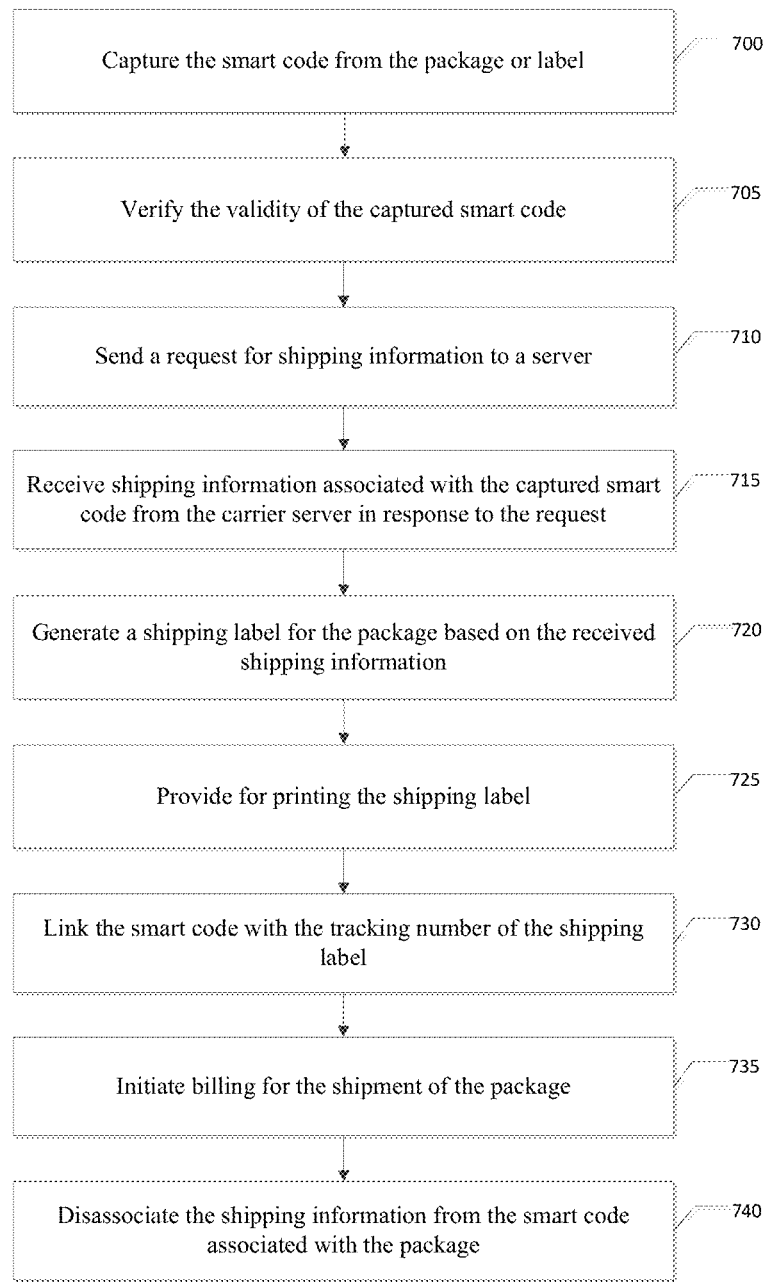

In various embodiments, the common carrier's system may include one or more carrier devices 105 configured to perform various functions of the claimed invention. For instance, the carrier may provide package delivery and collection personnel with a carrier device 105 that includes a shipping label application 440 to assist in performing various tasks. FIG. 7 illustrates a flowchart of the functionality of the shipping label application 440 for requesting shipping information linked to a smart code associated with a package to be shipped from a carrier server 104 and for generating a shipping label for the package based at least in part on the received shipping information, according to various embodiments. This flowchart may correspond to the steps carried out by the processing device 408 of the carrier device 105 shown in FIG. 4 as the processing device 408 executes the shipping label application 440 according to various embodiments.

According to various embodiments, an operator of a carrier device 105 executing the shipping label application 440 may receive a package having an associated representation of a smart code. In operation 700, the shipping label application 440 may be configured to capture the smart code from the package or label. In some embodiments, the shipping label application 440 may capture the smart code using a barcode scanner, camera, or other optical scanning device associated with the carrier device 105. For example, the shipping label application 440 may capture a photograph of the smart code representation associated with the package. In other embodiments, the shipping label application 440 may receive the smart code as input from an operator of the carrier device 105. For example, an operator may manually enter the smart code associated with the package into an interface provided by the shipping label application 440 on the carrier device 105. In this example, the operator may be able to read a non-encoded portion or version of the smart code (e.g., a numeric or alphanumeric code) and type the smart code into the shipping label application 440. In yet another embodiment, the shipping label application 440 may obtain the smart code associated with the package using alternative capture methods such as, for example, an RFID tag reader.

In operation 705, the shipping label application 440 may verify the validity of the captured smart code. In embodiments where the captured smart code representation comprises an encoded form of the smart code, the shipping label application 440 may first decode the smart code. The shipping label application 440, according to example embodiments, may perform error checking or other forms of verification on the decoded smart code. For example, the shipping label application 440 may perform a checksum function, hash function, and/or the like on the smart code, in some instances based on one or more check digits and/or parity bits. In an instance in which the verification fails, the shipping label application 440 may be configured to repeat operations 700 and 705.

In operation 710, the shipping label application 440 may be configured to send a request for shipping information to a server (e.g., a carrier server 104). In this regard, the request may comprise an indication of the captured smart code to allow the carrier server 104 to retrieve the requested shipping information based at least in part on the smart code. In some embodiments, the smart code may be sent in encoded form if the shipping label application 440 is not configured to decode the smart code.

In operation 715, the shipping label application 440 may receive shipping information associated with the captured smart code from the carrier server 104 in response to (e.g., after) the request. The shipping information may have been determined based at least in part on the smart code. In some embodiments, the shipping label application 440 may receive a confirmation number or other verification number associated with the smart code. In these embodiments, the shipping label application 440 may display the confirmation number to the operator so that an operator may compare the confirmation number with a confirmation number associated with the package.

In operation 720, the shipping label application 440 may be configured to generate a shipping label for the package based on the received shipping information. In this regard, the shipping information may comprise sufficient information for the shipping label application 440 to generate a shipping label without requiring any further input from the package. In some embodiments, the package may comprise additional information to either supplement or confirm the shipping information received, such as the confirmation number or destination address.

In operation 725, the shipping label application 440 may provide for printing the shipping label. In some embodiments, the shipping label application 440 may utilize an external printing device associated with the carrier device 105 (e.g., wired or wirelessly) to print the shipping label. In other embodiments, the shipping label application 440 may utilize a printing device integrated into the carrier device 105 to print the shipping label. Once printed, the operator of the carrier device 105 may apply the shipping label to the package. The shipping label may, in some instances, obscure the smart code or, in other instances, be applied so that both the smart code representation and shipping label are visible.

In operation 730, the shipping label application 440 may be configured to link the smart code with the tracking number of the shipping label. In this regard, the shipping label application 440 may use the smart code, the tracking number, or both to track the package through operations to delivery. For example, a carrier may track the package internally using the smart code while providing the tracking number to the user (e.g., customer) to track the package externally.

In operation 735, the shipping label application 440 may optionally initiate billing for the shipment of the package. In this regard, the shipping label application 440 may use the billing information in the shipping information received from the carrier server 104 to bill the user for shipping the package. In some embodiments, the shipping label application 440 may conduct the billing transaction, while in other embodiments the shipping label application 440 may provide the billing information to another entity to conduct the billing transaction. According to various embodiments, the shipping label application 440 may not initiate billing for the shipment of the package until the package has been delivered.

In operation 740, the shipping label application 440 may disassociate the shipping information from the smart code associated with the package. In some embodiments, the shipping label application 440 may disassociate the shipping information from the smart code associated with the package after applying the shipping label. In this regard, once the shipping label has been applied to the package, the smart code may no longer need to be linked to the shipping information. In some embodiments, the shipping label may comprise optical codes of the same or similar type as the smart code representation associated with the package. Thus, to avoid issues downstream during the shipping process, the smart code may be unlinked from any stored data to prevent confusing data associated with other codes included on the shipping label. In these embodiments, the smart code may not be used for tracking the package through to delivery. In other embodiments, the shipping label application 440 may not disassociate the shipping information from the smart code associated with the package until the package is delivered. In these embodiments, the smart code may be used to track the package through to delivery. For example, the smart code may be linked to a tracking number of the package.

In other embodiments, the number of smart codes may be limited and, therefore, once the shipping information has been received by the shipping label application 440 and a shipping label has been generated, the smart code may be made available for association with another package and its shipping information. According to some embodiments, the shipping label application 440 may send a request to the carrier server 104 to disassociate the shipping information from the smart code. In these instances, the carrier server 104 may be configured to perform the disassociation.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A mobile device comprising at least one processor and at least one memory including computer program code, the at least one memory and the computer program code configured to, with the processor, cause the mobile device to at least:
provide an interface for inputting shipping information associated with shipment of a package;
retrieve previously stored shipping information from a user profile, wherein the shipping information comprises a destination address;
populate the interface with the retrieved shipping information; and
transmit the shipping information and data associated with a smart code, associated with the package, to a carrier server for storage of the shipping information and the data associated with the smart code in association with each other.

2. The mobile device of claim 1, wherein prior to transmit the shipping information, the at least one memory and the computer program code are further configured to, with the processor, cause the mobile device to:
receive input from a user relating to the shipping information; and
capture an indication of the smart code associated with the package.

3. The mobile device of claim 2, wherein capture the indication of the smart code further comprises:

capturing an image of a smart code representation printed on the package; and determining the smart code based at least in part on the captured image of the smart code representation.

4. The mobile device of claim 3, wherein the smart code representation comprises an encoded version of the smart code, and wherein determining the smart code further comprises decoding the encoded version of the smart code.

5. The mobile device of claim 1, wherein the at least one memory and the computer program code are further configured to, with the processor, cause the mobile device to:

determine a geographic location of the mobile device; and identify a carrier drop-off location proximate the geographic location of the mobile device for providing the package to the carrier.

6. The mobile device of claim 1, wherein the shipping information is sufficient to generate a shipping label for the package without associating further information with the package.

7. A carrier server comprising at least one processor and at least one memory including computer program code, the at least one memory and the computer program code configured to, with the processor, cause the carrier server to at least:

transmit information retrieved from a user profile to a user device;

receive shipping information comprising a destination address and an indication of a smart code associated with a package from the user device;

link the shipping information to the smart code;

receive a request for shipping information for the package from a carrier device, wherein the request comprises an indication of the smart code associated with the package;

retrieve the shipping information associated with the package based at least in part on the smart code; and transmit the shipping information to the carrier device.

8. The carrier device of claim 7, wherein prior to link the shipping information, the at least one memory and the computer program code are further configured to, with the processor, cause the carrier server to:

store at least one of the shipping information and the smart code.

9. The carrier server of claim 7, wherein the at least one memory and the computer program code are further configured to, with the processor, cause the carrier server to:

determine the smart code based at least in part on the indication of the smart code received.

10. The carrier server of claim 7, wherein the at least one memory and the computer program code are further configured to, with the processor, cause the carrier server to:

receive a request from the user to schedule pick-up of the package, wherein the request comprises an indication of the location of the package; and arrange for dispatch of a carrier vehicle to the location to pick up the package.

11. The carrier server of claim 7, wherein the shipping information is sufficient to generate a shipping label for the package without obtaining further information from the package.

12. The carrier server of claim 7, wherein the at least one memory and the computer program code are further configured to, with the processor, cause the carrier server to:

verify the validity of the smart code.

13. A system comprising:
a carrier server; and
a carrier device;

wherein the carrier server is configured to:

transmit information retrieved from a user profile to a user device;

receive shipping information, comprising a destination address, and an indication of a smart code associated with a package from the user device; and link the shipping information to the smart code;

wherein the carrier device is configured to:

capture an indication of the smart code associated with the package; and transmit a request to the carrier server for shipping information associated with the package, wherein the request comprises an indication of the smart code, and wherein the carrier server is further configured to receive the request for shipping information from the carrier device, retrieve the shipping information associated with the package based at least in part on the smart code, and transmit the shipping information to the carrier device.

14. The system of claim 13, wherein:
the carrier device is further configured to:

receive the shipping information from the carrier server; and generate a shipping label for the package based at least in part on the shipping information.

15. The system of claim 13, further comprising:
a mobile device, wherein the mobile device is configured to:

provide an interface for inputting shipping information associated with shipment of the package;

receive input of shipping information from a user;

capture an indication of the smart code associated with the package; and transmit the shipping information and the smart code to the carrier server.

16. A computer program product comprising at least one non-transitory computer-readable storage medium having computer-executable program code instructions stored therein, the computer-executable program code instructions comprising:

program code instructions configured to provide an interface for inputting shipping information associated with shipment of a package;

program code instructions configured to retrieve previously stored shipping information comprising a destination address from a user profile;

program code instructions configured to populate the interface with the retrieved shipping information; and program code instructions configured to transmit the shipping information and a smart code, associated with the package, to a carrier server for storage of the shipping information and the smart code in association with each other.

17. The computer program product of claim 16, wherein prior to transmit the shipping information, the computer program product further comprises:

program code instructions configured to receive input from a user relating to the shipping information; and program code instructions configured to capture an indication of the smart code associated with the package.

18. The computer program product of claim 17, wherein the program code instructions configured to capture the indication of the smart code further comprises:

program code instructions configured to capture an image of a smart code representation printed on the package; and program code instructions configured to determine the smart code based at least in part on the captured image of the smart code representation.

19. The computer program product of claim 18, wherein the smart code representation comprises an encoded version of the smart code, and wherein the program code instructions configured to determine the smart code further comprises program code instructions configured to decode the encoded version of the smart code.

20. The computer program product of claim 16, further comprising:
program code instructions configured to determine a geographic location of the mobile device; and
program code instructions configured to identify a carrier drop-off location proximate the geographic location of the mobile device for providing the package to the carrier.

21. The computer program product of claim 16, wherein the shipping information is sufficient to generate a shipping label for the package without associating further information with the package.

22. A method comprising:
transmitting information retrieved from a user profile to a user device;
receiving shipping information, comprising a destination address and an indication of a smart code associated with a package from the user device;
linking the shipping information to the smart code;
receiving a request for shipping information for the package from a carrier device, wherein the request comprises an indication of the smart code associated with the package;
retrieving the shipping information associated with the package based at least in part on the smart code; and
transmitting the shipping information to the carrier device.

23. The method of claim 22, wherein prior to linking the shipping information, the method further comprises:
storing at least one of the shipping information and the smart code.

24. The method of claim 22, further comprising:
determining the smart code based at least in part on the indication of the smart code received.

25. The method of claim 22, further comprising:
receiving a request from the user to schedule pick-up of the package, wherein the request comprises an indication of the location of the package; and
arranging for dispatch of a carrier vehicle to the location to pick up the package.

26. The method of claim 22, wherein the shipping information is sufficient to generate a shipping label for the package without obtaining further information from the package.

27. The method of claim 22, further comprising:
verifying the validity of the smart code.

* * * * *